US007716657B2

(12) United States Patent
Inglis et al.

(10) Patent No.: US 7,716,657 B2
(45) Date of Patent: May 11, 2010

(54) COMPILER OPTIMIZATION WITH PRIVATIZING OF A NON-FINAL OBJECT

(75) Inventors: Derek Bruce Inglis, Markham (CA); Ali Ijaz Sheikh, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1374 days.

(21) Appl. No.: 10/978,073

(22) Filed: Oct. 28, 2004

(65) Prior Publication Data

US 2005/0138611 A1 Jun. 23, 2005

(30) Foreign Application Priority Data

Dec. 19, 2003 (CA) .................................. 2453776

(51) Int. Cl.
G06F 9/45 (2006.01)
(52) U.S. Cl. ........................ 717/151; 717/152; 717/154; 717/159
(58) Field of Classification Search ................. 717/149, 717/152, 154
See application file for complete search history.

(56) References Cited

U.S. PATENT DOCUMENTS

| 5,812,852 | A * | 9/1998 | Poulsen et al. .............. 717/149 |
| 6,223,340 | B1 * | 4/2001 | Detlefs ........................ 717/145 |
| 6,279,030 | B1 | 8/2001 | Britton et al. |
| 6,578,191 | B1 | 6/2003 | Boehme et al. |
| 2003/0070161 | A1 | 4/2003 | Wong et al. |
| 2004/0003382 | A1 * | 1/2004 | Steensgaard ................ 717/154 |

OTHER PUBLICATIONS

A Study of Devirtualization Techniques for a Java Just-In-Time Compiler, Kazuaki Ishizaki et al., From Conference on Object Oriented Programming Systems Languages and Applications Proceedings of the 15th ACM SIGPLAN conference on Object-oriented programming, systems, languages, and applications 2000, pp. 294-310.*
Fast, Effective Code Generation in a Just-In-Time Java Compiler Ali-Reza Adl-Tabatabai, Michel Cierniak, Guei-Yuan Lueh, Vishehs M. Parikh, James Stichnoth ACM SIGPLAN Notices vol. 33 , Issue 5, pp. 280-290 Year of Publication: 1998.*
Thin Guards: A Simple and Effective Technique for Reducing the Penalty of Dynamic Class Loading, Matthew Arnold and Barbara Ryder, Magnusson (Ed.): ECOOP 2002, LNCS 2374, pp. 498-524, 2002.*

(Continued)

Primary Examiner—Lewis A Bullock, Jr.
Assistant Examiner—Paul Mills
(74) Attorney, Agent, or Firm—Konrad Raynes & Victor LLP; Janaki K. Davda

(57) ABSTRACT

A method for compiler optimization particularly well suited to object-oriented language that permit dynamic class loading. The method permits the compiler optimization of code associated with a potentially polymorphic object that is a call parameter to a virtual procedure where the procedure is a candidate for devirtualization through inlining. The method includes steps for guarded devirtualizing of the procedure, insertion of code to ensure privatization of the object before the procedure is executed, creation of a guard assumptions associated with the object and application of known optimization techniques to the code associated with the object.

14 Claims, 2 Drawing Sheets

OTHER PUBLICATIONS

Marmot: An Optimizing Compiler for Java, Robert Fitzgerald, Todd B. Knoblock, Erik Ruf, Bjarne Steensgaard, and David Tarditi, Microsoft Research Jun. 16, 1999 Technical Report MSR-TR-99-33.*

Effective Flow Analysis for Avoiding Run-Time Checks, Suresh Jagannathan and Andrew Wright, Proceedings of the Second International Symposium on Static Analysis, pp. 207-224 Year of Publication: 1995 ISBN:3-540-60360-3.*

Design, Implementation and Evaluation of Adaptive Recompilation with On-Stack Replacement, Stephen J. Fink, Feng Qian, Proceedings of the International Symposium on Code Generation and Optimization, Mar. 2003.*

Arnold, M. & B.G. Ryder. "Thin Guards: A Simple and Effective Technique for Reducing the Penalty of Class Loading", ECOOP 2002, AN- 7374751.

Ishizaki, K., T. Yasue, M. Kawahito, & H. Komatsu. "A Direct Devirtualization Technique with the Code Patching Mechanism", *Transactions of the Information Processing Society of Japan*, vol. 43, No. 1, Jan. 2002, pp. 124-136 (*English Abstract Attached*).

Ishizaki, K., M. Kawahito, T. Yasue, H. Komatsu, & T. Nakatani. "A Study of Devirtualization Techniques for a Java Just-In-Time Compiler", *OOPSLA '00*, Oct. 2000, © 2000 ACM, pp. 294-310.

Ishizaki, K., M. Kawahito, T. Yasue, M. Takeuchi, T. Ogasawara, T. Suganuma, T. Onodera, H. Komatsu, & T. Nakatani. "Design, Implementation, and Evaluation of Optimizations in a Java Just-In-Time Compiler", *Proceedings of the ACM 1999 conference on Java Grande*, © 1999 ACM, pp. 119-128.

Pechtchanski, I. & V. Sarkar. "Dynamic Optimistic Interprocedural Analysis: A Framework and an Application", *OOPSLA '01*, © 2001 ACM, pp. 195-210.

Sreedhar, V. C., M. Burke, & J. Choi. "A Framework for Interprocedural Optimization in the Presence of Dynamic Class Loading", *PLDI 2000*, © 2000 ACM, pp. 196-207.

Suganuma, T., T. Yasue, M. Kawahito, H. Komatsu, & T. Nakatani. "A Dynamic Optimization Framework for a Java Just-In-Time Compiler", *OOPSLA '01*, © 2001 ACM, pp. 180-194.

Suganuma, T., T. Yasue, & T. Nakatani. "A Region-Based Compilation Technique for a Java Just-In-Time Compiler", *PLDI '03*, Jun. 9-11, 2003, © 2003 ACM, pp. 312-323.

Zaks, A., V. Feldman, N. Aizikowitz. "Sealed Calls in Java Packages", *OOPSLA '00*, Oct. 2000, © 2000 ACM, pp. 82-92.

Arnold, M., S. Fink, V. Sarkar, and P.F. Sweeney, "A Comparative Study of Static and Profile-Based Heuristics for Inlining", Proceedings of the ACM SIGPLAN Workshop on Dynamic and Adaptive Compilation and Optimization, Jan. 2000, ACM, Inc., pp. 1-13.

Canadian Office Action dated Oct. 15, 2008 for Application No. 2,453,776, 4 pp.

Dean, J., D. Grove, and C. Chambers, "Optimization of object-Oriented Programs Using Static Class Hierarchy Analysis", Proceedings of the 9th European Conference on Object-Oriented Programming, Aug. 1995, 25 pp.

Detlefs, D. and O. Agesen, "Inlining of Virtual Methods", ECOOP '99, Proceedings of the 13th European Conference on Object-Oriented Programming, Jun. 14-18, 1999, ISBN 3-540-66156-5, pp. 258-278.

* cited by examiner

COMPILER OPTIMIZATION WITH PRIVATIZING OF A NON-FINAL OBJECT

CROSS-REFERENCE TO RELATED FOREIGN APPLICATION

This application is a non-provisional application that claims priority from the commonly assigned Canadian Patent Application entitled "Compiler Optimization", having Canadian Patent Application Serial No. 2,453,776, filed on Dec. 19, 2003, by Derek B. Inglis and Ali I. Sheikh, which application is incorporated herein by reference in its entirety.

FIELD OF INVENTION

The present invention relates to the field of compilers for computer executable instructions. In particular, to a method for optimizing the computer executable instructions generated by a compiler.

BACKGROUND

The time required to execute computer executable instructions (i.e. programs) can be reduced by applying compiler optimizations. Programs that consist of many short procedures benefit in particular from inter-procedural optimizations. The object-oriented approach to programming promotes the use of short procedures (commonly known as methods) to encapsulate functionality and to provide modularity and abstraction. These procedures are frequently virtual procedures.

A common inter-procedural optimization technique is inlining. Inlining reduces the overhead of a procedure call by replacing the procedure call with a called (i.e. target) procedure directly in the body of a calling procedure. Inlining also increases the opportunities for applying other compiler optimization techniques. An exemplary description of inlining is provided in *A Comparative Study Of Static And Dynamic Heuristics For Inlining*, Matthew Arnold, Stephen Fink, Vivek Sarkar, and Peter F. Sweeney, ACM SIGPLAN Workshop on Dynamic and Adaptive Compilation and Optimization, January 2000 which is incorporated in its entirety herein by reference.

When a virtual procedure call is executed, a declared procedure or one of several procedures that can override it is actually invoked. The declared procedure and the overriding procedures are known as target procedures of the virtual procedure call. The overriding of a target procedure for a virtual procedure call is a function of the dynamic class definition (i.e. polymorphism) of an object containing the virtual procedure. The dynamic nature of virtual procedures creates important challenges for implementing inter-procedural optimizations. An approach known as call devirtualization can be used to introduce compiler optimization in the case of a virtual procedure call.

Many devirtualization techniques are known for reducing the runtime overhead of virtual procedure calls for various object-orient languages by inlining of the procedure or replacing the virtual procedure call with a direct procedure call. One such technique is guarded devirtualization. In guarded devirtualization a class or method (i.e. procedure) test is used to ensure that the inlined procedure or the direct call to a target method is valid. This technique is highly effective in dynamically-typed object-oriented languages but is much less effective in statically-typed object-oriented languages such as, for example, Java. Exemplary descriptions of guarded devirtualization are provided in *Inlining of Virtual Methods*, David Detlefs and Ole Agesen, ECOOP '99 and *Thin Guards: A simple and Effective Technique for Reducing the Penalty of Dynamic Class Loading* (2202), Matthew Arnold, Barbara G. Ryder, Proceedings of the Sixteenth European Conference on Object Oriented Programming (Malaga, Spain, June 2002) which are incorporated in their entirety herein by reference.

Another devirtualization technique known as direct devirtualization eliminates the guard test by applying whole program analysis and optimizations using a static compiler. Direct virtualization is generally based on a closed-world assumption in which no dynamic class loading is allowed. Therefore, this technique is less effective when applied to languages such as Java™ which permit dynamic class loading without placing generally unacceptable constraints on the use of important features of the language.

Yet another technique known as direct devirtualization with code patching employs inlining of a target procedure at the virtual procedure call site. The inlined instructions are executed until an assumption that permits devirtualization is invalidated such as, for example when the target procedure is overridden. When the assumption is invalidated, the compiler performs code patching to cause the virtual procedure call to be executed instead of the inlined procedure.

In dynamic languages dynamically loaded classes may be encountered at runtime. Call devirtualization based on interclass analysis may be invalidated when new classes are loaded. A mechanism for dealing with new classes that appear at runtime is to detect invalidated optimizations at runtime and to correct them using recompilation. Such a deoptimization mechanism can discover if a newly loaded class invalidates any existing inlinings and correct every such inlining by recompiling the appropriate procedures. A difficulty with this mechanism occurs when a procedure that needs to be recompiled is currently executing. There is a set of circumstances (known as preexistence) that avert this complication. Currently-executing procedures that contain invalidated inlinings are allowed to continue executing the original code until they exit. Only subsequent invocations of the procedure are to execute the recompiled code.

A further refinement of this approach is to correct invalidated inlining by replacing a single instruction with a jump to the original virtual call. This reduces the runtime penalty associated with recompiling and is known as code patching. An exemplary description of code patching is provided in *A Direct Devirtualization Technique with the Code Patching Mechanism*, Kazuaki Ishizaki, Toshiaki Yasue, Motohiro Kawahito, Hideaki Komatsu, IPSJ Transactions on Programming Vol. 43 No. SIG08-011, which is incorporated in its entirety herein by reference.

Invariant argument preexistence (herein after preexistence) is said to occur when the receiver object for a procedure call has been allocated before the invocation of a caller procedure. When preexistence occurs, the class of the receiver object does not change in the scope of invocation of the caller procedure. Even when a class loading event that overrides the called procedure occurs, the called procedure associated with the receiver object will not be overridden during the execution of the caller procedure. This property can be exploited in implementing compiler optimizations such as direct devirtualization. When preexistence occurs, the caller procedure does not need to be recompiled during the execution of the calling procedure and therefore mechanisms such as backup paths, on-stack replacement and other similar mechanisms are not required. The caller procedure does need to be recompiled or code patched at its next invocation in which the called procedure has been overridden. An exemplary description of preexistence is provided in *Inlining of Virtual Methods* (supra).

What is needed is a method that permits additional interprocedural compiler optimizations of computer executable instructions associated with objects subject to run-time polymorphism.

SUMMARY OF INVENTION

A method according an exemplary embodiment of the present invention, known as inner preexistence, relates to the optimization of compiled computer executable instructions. The method is particularly well suited to application to object-oriented computer languages that support dynamic class loading such as, for example, Java. The method can be applied, for example, when a computer executable procedure (commonly known in the field of object-oriented programming as a method) is a virtual procedure and has as a call parameter a virtual (a.k.a. non-final in Java) object. In the method according to the present invention, the procedure is devirtualized at a call site, for the virtual procedure, by being inlined and by creating guard code responsive to guard assumptions. Code (i.e. computer executable instructions) is inserted before the inlined procedure to ensure that the virtual object (i.e. the call parameter) is privatized (i.e. is thread local). A guard assumption associated with the object is added to the guard assumptions for the procedure. As a result of the preceding steps, optimization to the computer executable instructions associated with the object can be applied within the devirtualized procedure.

In accordance with one aspect of the present invention, a method for optimization, by a compiler of a non-final object-oriented language, of computer executable instructions associated with an object that is a call parameter to a virtual procedure at a call site including the steps of: a) devirtualizing the call site of the virtual procedure; b) adding computer executable instructions for privatizing the object before the devirtualized call site; c) creating a guard assumption for the devirtualized call site associated with the object; and d) applying optimization to computer executable instructions associated with the object within the devirtualized call site1.

In accordance with another aspect of the present invention, a method for enabling optimization, by a compiler of an object-oriented language, of the computer executable instructions associated with a non-final object that is a call parameter to a virtual procedure at a call site including the steps of: a) devirtualizing the call site for the virtual procedure; b) adding computer executable instructions for privatizing the object before the devirtualized call site; and c) creating a guard assumption for the devirtualized call site associated with the object.

In accordance with a further aspect of the present invention, a computer program product for optimization, by a compiler of an object-oriented language, of computer executable instructions associated with a non-final object that is a call parameter to a virtual procedure at a call site, the computer program product including: computer readable program code devices for: a) devirtualizing the call site of the virtual procedure; b) adding computer executable instructions for privatizing the object before the devirtualized call site; c) creating a guard assumption for the devirtualized call site associated with the object; and d) applying optimization to computer executable instructions associated with the object within the devirtualized call site.

In accordance with yet another aspect of the present invention, a computer program product for enabling optimization, by a compiler of a non-final object-oriented language, of the computer executable instructions associated with a object that is a call parameter to a virtual procedure at a call site, the computer program product including: computer readable program code devices for: a) devirtualizing the call site of the virtual procedure; b) adding computer executable instructions for privatizing the object before the devirtualized call site; and c) creating a guard assumption for the devirtualized call site associated with the object.

Other aspects and features of the present invention will become apparent to those ordinarily skilled in the art to which it pertains upon review of the following description of specific embodiments of the invention in conjunction with the accompanying figures.

BRIEF DESCRIPTION OF DRAWINGS

The present invention will be described in conjunction with the drawings in which.

DETAILED DESCRIPTION

Figure 1:
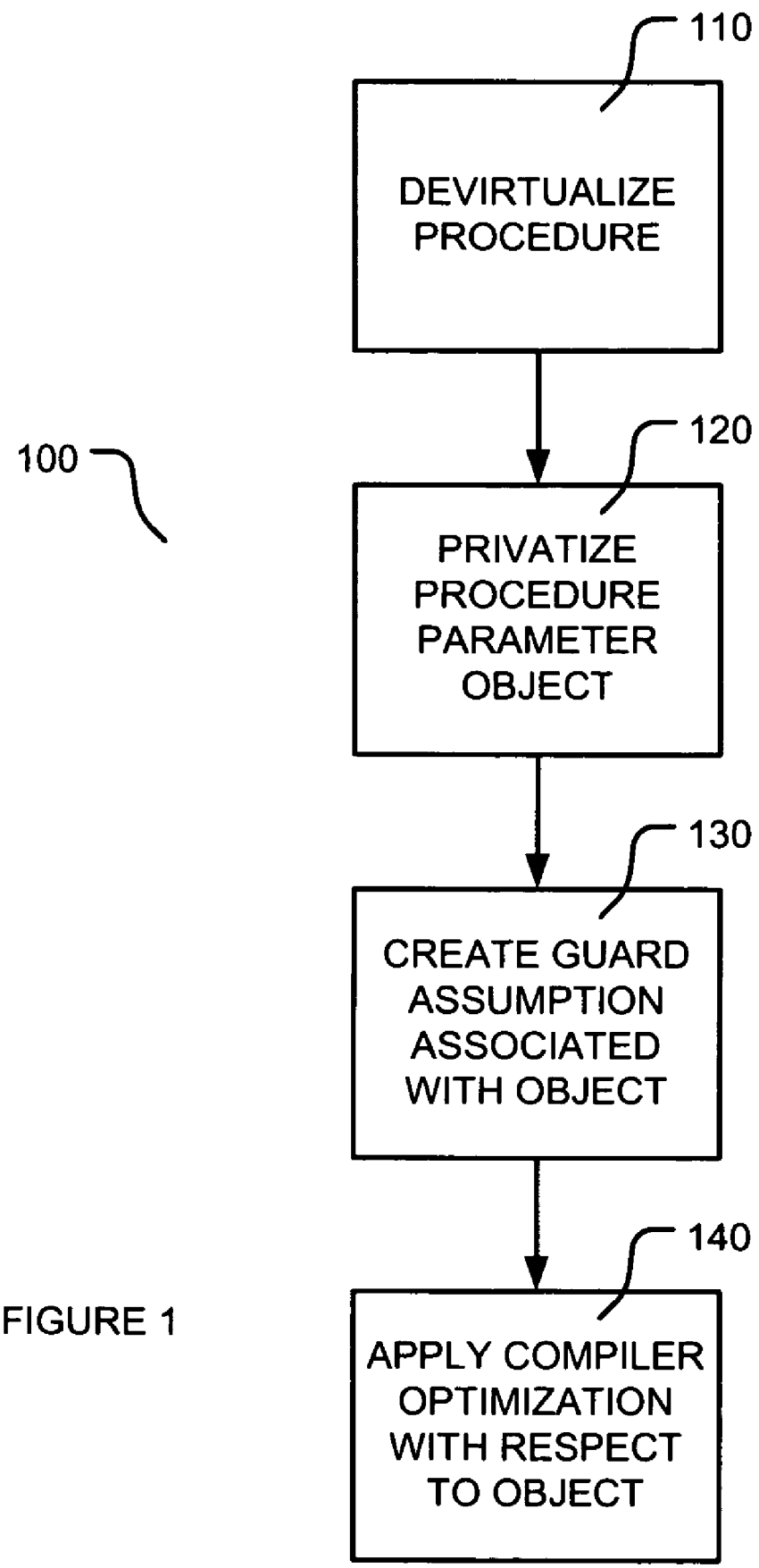
FIG. 1 is a flow diagram representing steps in an exemplary embodiment of a method according to the present invention.

FIG. 1 represents a flow diagram depicting steps in a method 100 according to an exemplary embodiment of the present invention. The method 100 can be applied, for example, during compiler optimization when there exists a non-final object (i.e. who's class can be extended or subtyped through polymorphism) as a call parameter for a procedure at a call site that can be devirtualized as a result of compiler optimization. In the first step 110, the call site is devirtualized by inlining of the procedure. That is, a virtual procedure call to the procedure is replaced by a copy of the procedure directly at the call site. Preferably, guard code that consists of no operation (NOP) instructions is inserted before the inlined procedure. Guard assumptions are also created for invalidating the devirtualization of the procedure when the definition (i.e. hierarchy) of a class declaring the procedure is extended or when the procedure is overridden. Invalidation of a guard assumption results in the deoptimization of the procedure call (i.e. code patching is used to replace the inlined procedure with code for calling the virtual procedure) at run-time. According to an alternative embodiment of the method 100 of the present invention, guard code can be inserted and a null or no guard assumption created in a case where inlining of the procedure would not normally require guard code to be inserted and a guard assumption created (e.g. when the procedure is static or a class defining the procedure is final). The next step 120 ensures that the object (i.e. the call parameter) will preexist an invocation of the procedure. This is accomplished by privatizing the object by, for example, causing an evaluation of the object in the computer executable code into which the calling procedure is inline before the location of the inlined calling procedure. A guard assumption is created for the object in step 130. The guard assumption for the object invalidates the devirtualization of the procedure when, for example, the definition of the class of the object is extended or when a procedure declared in the class of the object is overridden. Invalidation of a guard assumption for the object results in the deoptimization of the procedure call at run-time. In step 140 compiler optimization with respect to the object can be applied. Compiler optimization can take the form of, for example, inlining of a procedure declared in the class of the object, the elimination of run-time type-checking functions, common sub-expression elimination, code motion transformations, bounds-checking elimination and other similar compiler optimizations with respect to the object.

The following is a segment of Java code that is used to illustrate a scenario in which a method according to the present invention can be applied.

```
class A {
    public C c;
    public void foo(B b) {b.bar(c); }
}
class B {
    public void bar(C c) {c.goo( ); }
}
class C {
    public void goo( ) {...}
}
```

The code segment includes declarative statements defining three object classes—A, B and C. The definition of class A contains declarations of a public variable c of type (i.e. class) C and of a public method foo(B b) having a call parameter b of type B. Class A is said to define a method foo(B b) in the conventional sense of the term method as generally applied in the realm of object-oriented programming to procedures associated with an object. For clarity all such methods of objects will herein after be referred to by the term 'procedure'. Therefore, restating—class A contains a declaration of a public procedure foo(B b). Similarly, the definition of class B contains a declaration of a public procedure bar(C c) having, a call parameter c of type C (herein after denoted as B::bar(C)). Finally the definition of class C defines a public procedure goo( ).

The procedure foo of class A contains a call to b.bar(c). The location of the call to b.bar(c) in foo is referred to as a call site. Using known techniques, a compiler can optimize computer executable instructions generated from the above code segment by inlining b.bar(c) into foo. Inlining of the procedure is effected by replacing the call to b.bar(c) with a copy of b.bar (c) at the call site. If the class B is polymorphic then the procedure B::bar(C) is subject to being overridden. In order to guard against the inlined computer executable instructions corresponding to b.bar(c) being invalidated by B::bar(C) being overridden, guard code can be inserted around the inlined call sight. The guard code imposes a run-time overhead cost which is undesirable. The run-time overhead of the guard code can be mitigated using a technique called code patching. The guard code can be replaced, using code patching, by NOP instructions. An optimization assumption can be put in place that is triggered by, for example, any changes to the definition of class B or more specifically to the definition of B::bar(C). Should class B or procedure b.bar(c) be subject to polymorphism such as, for example, by the overriding of procedure B::bar(C) then an assumption that b.bar(c) is monomorphic is invalidated. The NOP instructions are then overwritten with code to call the procedure b.bar(c). This overwriting of the instructions is known as code patching. The result is deoptimization of the procedure b.bar(c).

The method 100 according to an exemplary embodiment of the present invention provides for the procedure c.goo( ) to be inlined in the procedure b.bar(c) which itself is inlined. Using the method 100 of the present invention, no guard code is placed around the call site of c.goo( ) in the inlined computer executable instructions corresponding to b.bar(c). Code is also added before the inlined computer executable instructions corresponding to b.bar(c) to, for example, evaluate c thus ensuring the preexistence of c in the scope of execution of b.bar(c). An additional optimization assumption is added to those created for the inlined b.bar(c) such that a change to the definition of class C or to the definition of c.goo( ) will have similar effect as a change to the definition of class B or to the definition of B::bar(C) as described above. That is, the NOP instructions around the call site for the inlined b.bar(c) are overwritten with code to call virtual procedure b.bar(c). This ensures that when the optimization assumption for class C or procedure goo( ) is invalidated (i.e. the class C is polymorphic) that any new threads executing in b.bar(c) will use the correct definition of goo( ).

The method 100 according to the present invention is not limited to the inlining of a procedure. The method 100 according to the present invention can also permit other forms of compiler optimizations with respect to an object that is a call parameter to a virtual procedure which is devirtualized by inlining. Compiler optimizations in the form of, for example, the elimination of run-time type-checking functions (e.g. in Java the use of checkcast which checks that an operand can be cast to a given type and instanceof which tests whether an object reference or array belongs to a given class), common sub-expression elimination (a.k.a. commoning), code motion transformation (e.g. loop-invariant optimization), bounds-checking elimination (e.g. in Java when accessing arrays), other similar compiler optimizations and combinations thereof can also be applied in accordance with the method 100 of the present invention.

The method 100 according to the present invention can be implemented by a computer program product comprising computer readable program code devices.

Figure 2:
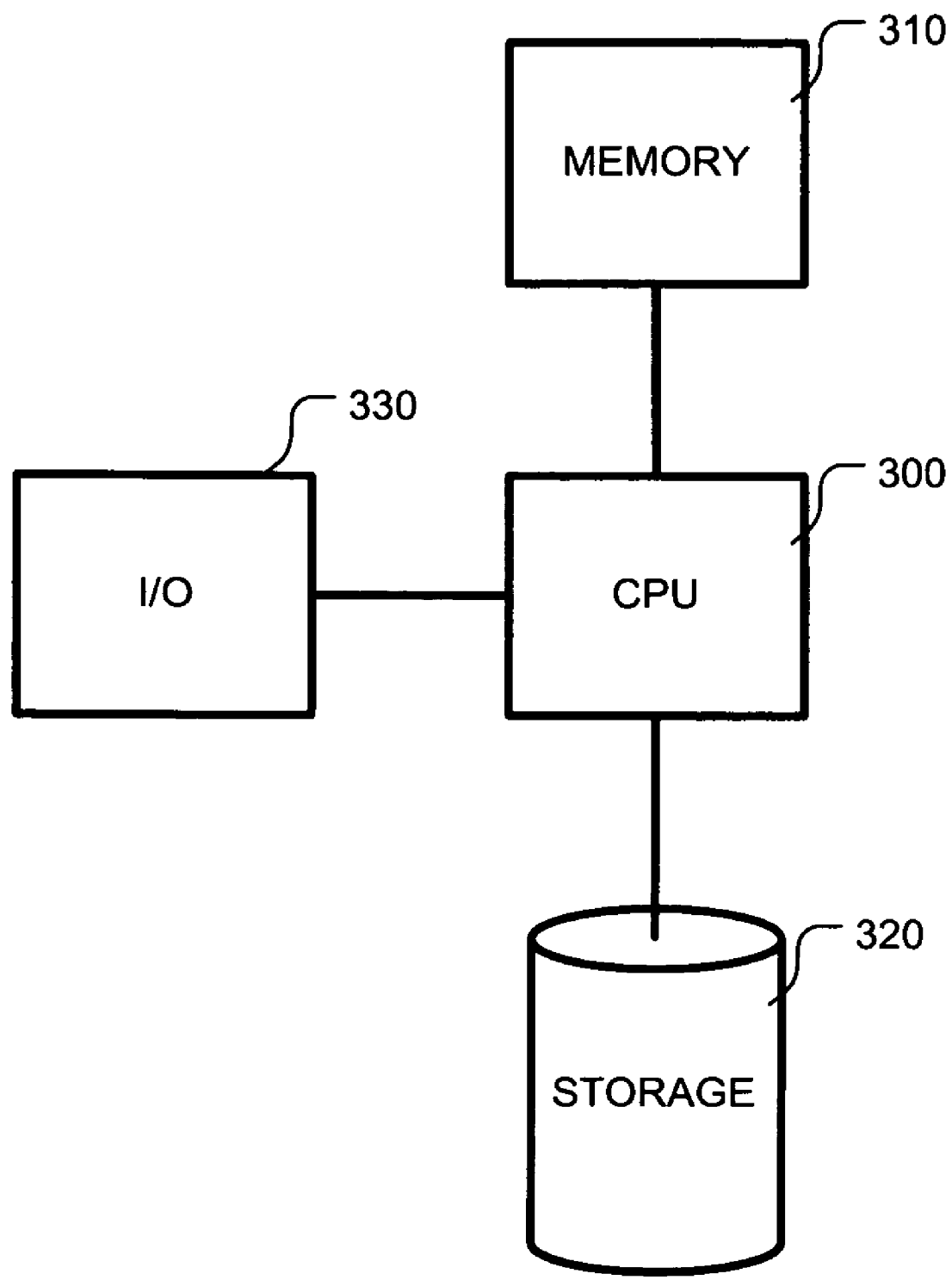
FIG. 2 is a schematic representation of an exemplary generic computing platform on which the present invention can be practiced.

FIG. 2 is a schematic representation of an exemplary generic computing platform on which the present invention can be practiced. A central processing unit (CPU) 300 provides main processing functionality. A memory 310 is coupled to CPU 300 for providing operational storage of programs and data. Memory 310 can comprise, for example, random access memory (RAM) or read only memory (ROM). Non-volatile storage of, for example, data files and programs is provided by a storage device 320 that can comprise, for example, disk storage. Both memory 310 and storage device 320 comprise computer useable media that can store computer program products in the form of computer readable program code. User input and output is provided by an input/output (I/O) facility 330. The I/O facility 330 can include, for example, a graphical display, a mouse and a keyboard.

It will be apparent to one skilled in the art that numerous modifications and departures from the specific embodiments described herein may be made without departing from the spirit and scope of the present invention.

The invention claimed is:

1. A method for optimization, by a compiler of an object-oriented language, of computer executable instructions associated with a non-final object that is a call parameter to a virtual procedure at a call site comprising:
   a) with a computing platform having a central processing unit, devirtualizing the call site of the virtual procedure, wherein the object-oriented language is a statically-typed object-oriented language that permits dynamic class loading, and wherein the devirtualizing includes inlining computer executable instructions associated with a target procedure for the virtual procedure;
   b) in response to the devirtualizing, inserting computer executable instructions for privatizing the object before the devirtualized call site, wherein privatizing the object comprises causing an evaluation of the object in computer executable code into which a calling procedure is inline before a location of the inlined calling procedure, wherein the privatization ensures that the object preexists an invocation of the inlined procedure, and wherein the privatized object is thread local;

c) in response to the privatizing, creating a guard assumption for the devirtualized call site associated with the object, wherein the guard assumption invalidates the devirtualization of the virtual procedure when a definition of a class of the object is extended or when a procedure declared in the class of the object is overridden; and d) applying optimization to computer executable instructions associated with the object within the devirtualized call site.

2. The method of claim 1 wherein applying optimization includes inlining the computer executable instructions associated with another virtual procedure contained in the object.

3. The method of claim 1 wherein applying optimization includes elimination of run-time type-checking functions in the computer executable instructions associated with the object.

4. The method of claim 1 wherein applying optimization includes common sub-expression elimination in the computer executable instructions associated with the object.

5. The method of claim 1 wherein applying optimization includes code motion transformation of the computer executable instructions associated with the object.

6. The method of claim 1 wherein applying optimization includes bounds checking elimination in the computer executable instructions associated with the object.

7. A method for enabling optimization, by a compiler of an object-oriented language, of the computer executable instructions associated with a non-final object that is a call parameter to a virtual procedure at a call site comprising:

a) with a computing platform having a central processing unit, devirtualizing the call site for the virtual procedure, wherein the object-oriented language is a statically-typed object-oriented language that permits dynamic class loading, and wherein the devirtualizing includes inlining computer executable instructions associated with a target procedure for the virtual procedure;

b) in response to the devirtualizing, inserting computer executable instructions for privatizing the object before the devirtualized call site, wherein privatizing the object comprises causing an evaluation of the object in computer executable code into which a calling procedure is inline before a location of the inlined calling procedure, wherein the privatization ensures that the object preexists an invocation of the inlined procedure, and wherein the privatized object is thread local; and c) in response to the privatizing, creating a guard assumption for the devirtualized call site associated with the object, wherein the guard assumption invalidates the devirtualization of the virtual procedure when a definition of a class of the object is extended or when a procedure declared in the class of the object is overridden.

8. A computer program product stored on a storage device for optimization, by a compiler of an object-oriented language, of computer executable instructions associated with a non-final object that is a call parameter to a virtual procedure at a call site, the computer program product comprising:

computer readable program code devices for:

a) devirtualizing the call site of the virtual procedure, wherein the object-oriented language is a statically-typed object-oriented language that permits dynamic class loading, and wherein the devirtualizing includes inlining computer executable instructions associated with a target procedure for the virtual procedure;

b) in response to the devirtualizing, inserting computer executable instructions for privatizing the object before the devirtualized call site, wherein privatizing the object comprises causing an evaluation of the object in computer executable code into which a calling procedure is inline before a location of the inlined calling procedure, wherein the privatization ensures that the object preexists an invocation of the inlined procedure, and wherein the privatized object is thread local;

c) in response to the privatizing, creating a guard assumption for the devirtualized call site associated with the object, wherein the guard assumption invalidates the devirtualization of the virtual procedure when a definition of a class of the object is extended or when a procedure declared in the class of the object is overridden; and d) applying optimization to computer executable instructions associated with the object within the devirtualized call site.

9. The computer program product of claim 8, wherein the computer readable program code devices for applying optimization include inlining the computer executable instructions associated with another virtual procedure contained in the object.

10. A computer program product stored on a storage device for optimization, by a compiler of an object-oriented language, of computer executable instructions associated with a non-final object that is a call parameter to a virtual procedure at a call site, the computer program product comprising:

computer readable program code devices for:

a) devirtualizing the call site of the virtual procedure, wherein the object-oriented language is a statically-typed object-oriented language that permits dynamic class loading, and wherein the devirtualizing includes inlining computer executable instructions associated with a target procedure for the virtual procedure;

b) in response to the devirtualizing, inserting computer executable instructions for privatizing the object before the devirtualized call site, wherein privatizing the object comprises causing an evaluation of the object in computer executable code into which a calling procedure is inline before a location of the inlined calling procedure, wherein the privatization ensures that the object preexists an invocation of the inlined procedure, and wherein the privatized object is thread local;

c) in response to the privatizing, creating a guard assumption for the devirtualized call site associated with the object, wherein the guard assumption invalidates the devirtualization of the virtual procedure when a definition of a class of the object is extended or when a procedure declared in the class of the object is overridden.

11. The computer program product of claim 8, the computer readable program code devices for of applying optimization includes elimination of run-time type-checking functions in the computer executable instructions associated with the object.

12. The computer program product of claim 8, wherein the computer readable program code devices for applying optimization include common sub-expression elimination in the computer executable instructions associated with the object.

13. The computer program product of claim 8, wherein the computer readable program code devices for applying optimization include code motion transformation of the computer executable instructions associated with the object.

14. The computer program product of claim 8, wherein the computer readable program code devices for applying optimization include bounds checking elimination in the computer executable instructions associated with the object.

* * * * *